United States Patent [19]

Retallick

[11] Patent Number: 4,597,262
[45] Date of Patent: Jul. 1, 1986

[54] CATALYTIC CONVERTER FOR A DIESEL ENGINE

[76] Inventor: William B. Retallick, 1432 Johnny's Way, West Chester, Pa. 19382

[21] Appl. No.: 648,381

[22] Filed: Sep. 7, 1984

[51] Int. Cl.$^4$ ............................................... F01N 3/02
[52] U.S. Cl. ................. 60/274; 55/DIG. 30; 60/286; 60/299; 60/311
[58] Field of Search ............. 60/311, 299, 274, 286; 422/180, 171; 55/DIG. 30, 283; 502/527

[56] References Cited

U.S. PATENT DOCUMENTS

| 3,642,094 | 2/1972 | Yancey | 60/299 |
| 3,716,344 | 2/1973 | Ashburn | 422/180 |
| 4,190,559 | 2/1980 | Retallick | 502/527 |
| 4,404,795 | 9/1983 | Oishi | 60/303 |
| 4,462,208 | 7/1984 | Hicks | 60/311 |

FOREIGN PATENT DOCUMENTS

| 2815317 | 10/1979 | Fed. Rep. of Germany | 60/299 |
| 2131321 | 6/1984 | United Kingdom | 60/286 |
| 2134408 | 8/1984 | United Kingdom | 60/286 |

Primary Examiner—Douglas Hart
Attorney, Agent, or Firm—William H. Eilberg

[57] ABSTRACT

A catalytic converter for a diesel engine comprises a stack of metal strips, coated with a combustion catalyst, the strips being spaced apart by indentations. The indentations are aligned transversely to the flow axis of the converter, and are staggered so that the exhaust gas follows a tortuous path as it flows between the strips. Particulates in the exhaust gas are trapped out in the clefts formed where an indentation presses against the adjacent strip. At intervals, fuel is injected into the exhaust gas. The fuel burns on the catalyzed surface and heats the converter sufficiently to burn the trapped particulates. In an alternative embodiment, there are two converters, and fuel is automatically injected into that converter which has more trapped particulates, so as to burn the particulates trapped in that converter.

30 Claims, 5 Drawing Figures

CATALYTIC CONVERTER FOR A DIESEL ENGINE

BACKGROUND OF THE INVENTION

This invention discloses a catalytic converter for a diesel engine. More specifically, it discloses a catalytic converter that traps out the particulates in the exhaust gas and retains the particulates so that they can be burned off intermittently. Then the catalytic converter is again loaded with trapped particulates that are burned off at the end of the next cycle.

Catalytic converters are now standard equipment on gasoline powered automobiles, and their practicality for gasoline engines is well demonstrated. Catalytic converters for diesel engines pose different problems which have not yet been solved. Diesel exhaust is cooler than the exhaust from a gasoline engine, especially when the diesel engine is idling or running at low power output. Sometimes the diesel exhaust is so cool that a catalytic converter cannot light off and burn the easily-combustible carbon monoxide and hydrocarbons in the exhaust. Even when the diesel engine is running at high power output, the exhaust is seldom hot enough to burn the particulates therein. The particulates would pass through the converter and add to the suspended solids in the atmosphere. It is especially important to remove these diesel particulates because they are suspected of being carcinogenic.

The problem of diesel particulates and previous attempts to remove them have been described in three reports sponsored by the U.S. Environmental Protection Agency. These are EPA-600/7-79-232b, EPA-625/9-79-004, and "Ignition Properties and Catalytic Oxidation of Diesel Particulate," of the Battelle Columbus Laboratories, 1982. These reports describe particulate traps that comprised quartz wool, stainless steel wool, and ceramic honeycombs similar to those used for catalyst supports in automobile converters. The quartz wool was not nearly rugged enough. The stainless steel collapsed when it was heated by the burning particulates. The honeycomb tested at Battelle was a bundle of square channels having thin porous walls through which the exhaust gas was made to pass. The face of the honeycomb was a square grid, like a checkerboard, but with very small squares, say, 200 squares per square inch. If all the red squares in the supposed checkerboard are plugged on the inlet face of the honeycomb, and all of the black squares are plugged on the outlet face, then the gas must pass through one ceramic wall during its passage through the honeycomb. This arrangement did trap out the particulates, within on upon the porous walls of the honeycomb. But the pressure drop rose rapidly and reached six inches of mercury after only fifteen minutes. Such a pressure drop is much too high to be practical. The collected particulates were catalyzed for burning by spraying them with a solution of a copper salt.

The term "pressure drop" as used herein means the difference between the pressure at the input end and the pressure at the output end of the converter. A high pressure drop is undesirable, because it reduces the efficiency of the engine. With a high pressure drop, as would be cauxed by an excessive amount of particulates in the converter, the engine must expend extra energy to force the exhaust gas through the converter, in addition to supplying energy for locomotion.

In the present invention, the particulates are not collected in a single compact layer through which the exhaust must pass, but instead the particulates are distributed throughout the entire converter so that the pressure drop builds up slowly.

SUMMARY OF THE INVENTION

In its basic embodiment, the catalytic converter of the present invention comprises a stack of metal strips that are spaced apart by indentations. The strips are coated with a combustion catalyst. The indentations are of equal height so that the spacing between the strips is equal to this height. The identations are aligned transversely to the flow axis of the converter and the indentations are staggered so that the exhaust gas follows a tortuous path as it flows between the strips. The gas makes a right angle turn each time it impinges on one of the identations. The particulates are trapped in the cleft formed when an identation presses against the adjacent strip.

There is a cleft on both the upstream and the downstream side of each identation. Particulates can be collected and stored in both clefts. Particulates would be driven into the upstream cleft as the gas makes a right angle turn around the identation. Particules would be deposited in the downstream cleft because the gas velocity is reduced in the waks of the identation.

The exhaust gas makes many right angle turns during its passage through the converter, and each turn removes a fraction of the particulates. In this way, the particulates are distributed throughout the entire converter so that the pressure drop does not build up rapidly.

In another embodiment, the apparatus automatically determines when the converter is filled with particulates. When the apparatus measures the pressure drop to be above a preset level, indicating that the converter is so filled, fuel is injected into the exhaust gas to raise the temperature in the converter sufficiently to burn the particulates. The temperature of the gas is monitored, and the flow of fuel is regulated automatically to maintain a temperature which is sufficient for burning the particulates, but which is not high enough to destroy the catalyst.

In still another embodiment, there are two catalytic converters, of identical construction, and disposed in parallel. When the apparatus senses a pressure drop exceeding a preset level, the apparatus determines automatically which converter is more clogged with particulates, and directs fuel into that converter, burning off the particulates therein until the converter is sufficiently cleared.

It is therefore an object of the invention to provide a catalytic converter for a diesel engine, which converter traps out the particulates and retains them so that they can be burned off intermittently.

It is another object to provide a catalytic converter wherein the accumulated particulates are distributed throughout the converter so that the pressure drop does not build up rapidly.

It is another object to provide a trap for diesel particulates that has a simple design and is economical to construct.

It is a further object to provide a catalytic converter for a diesel engine, wherein the burn-off of particulates trapped within the converter is accomplished automatically.

It is a further object to provide a catalytic converter for a diesel engine having two substantially identical sections, and wherein the particulates in only one converter section at a time are burned off.

It is a further object to provide a catalytic converter in two sections, as described above, wherein the sensing and control functions are performed automatically.

Other objects and advantages of the present invention will be apparent to those skilled in the art, from a reading of the following brief description of the drawings, the detailed description of the invention, and the appended claims.

DETAILED DESCRIPTION OF THE INVENTION

Figure 1:
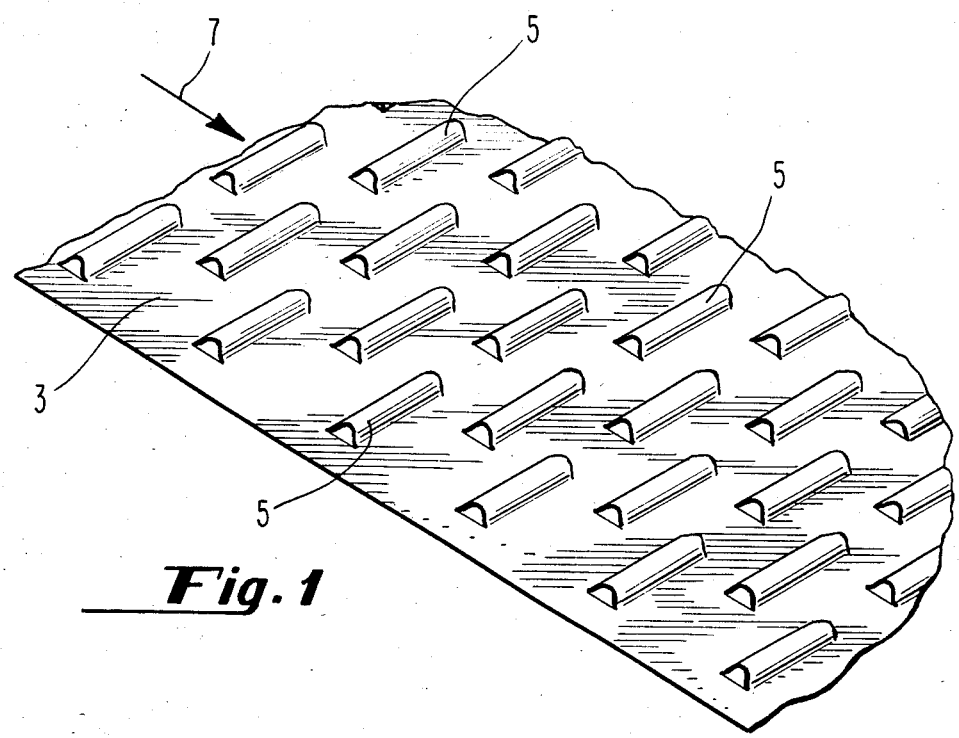
FIG. 1 is a perspective view of a fragment of one layer of the catalytic converter made according to the present invention.

This invention discloses a catalytic converter for a diesel engine. In its simplest form, the converter comprises a stack of metal strips that are coated with a combustion catalyst and spaced apart by indentations. FIG. 1 is a perspective view of a fragment of a one such strip 3 having indentations 5 of cylindrical shape. The cylindrical shape is generated by a straight line that remains parallel to its original position as it generates the surface. The stack of strips is supported within a suitable housing, not shown.

The indentations need not be cylindrical. It may be advantageous to generate the indentations by the translation of a curved line instead of a straight line. The concave side of the curved indentation can face upstream or downstream. Whatever their shape, the indentations must be of equal height, so that the spacing between the metal strips is equal to this height. Cylindrical indentations are described in my U.S. Pat. No. 4,162,993, which is incorporated by reference herein.

Figure 2:
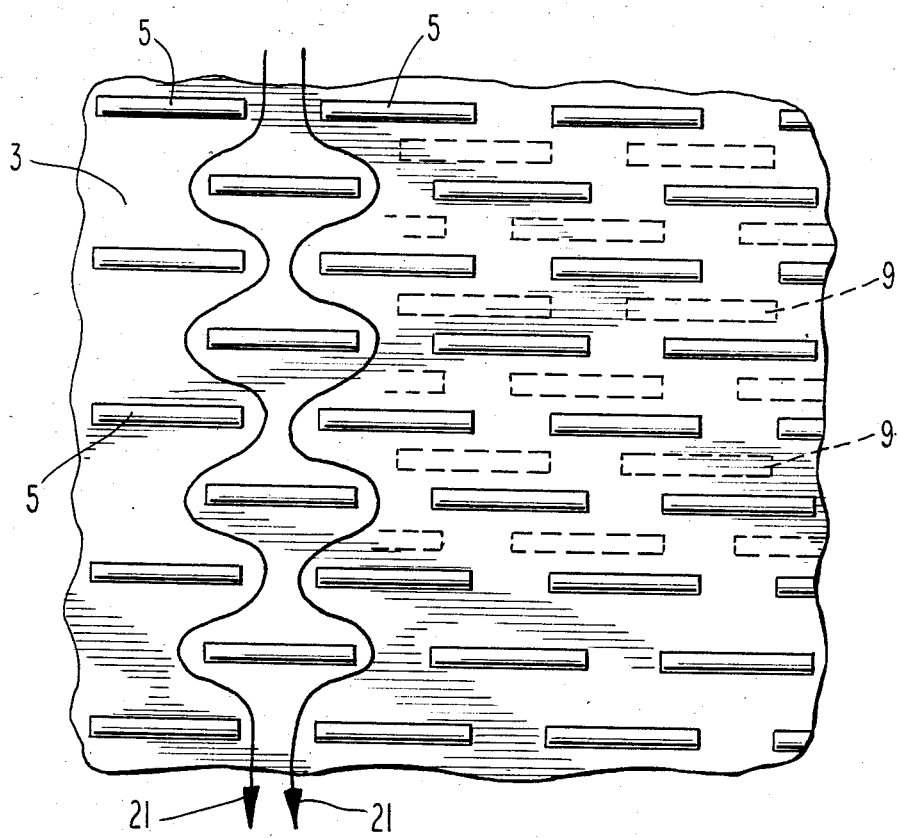
FIG. 2 is a fragmentary top view of one layer of the catalytic converter, showing the tortuous flow path of the exhaust gas through the staggered indentations.

The indentations 5 are aligned transversely to the flow axis of the converter and are staggered. Arrow 7 indicates the direction of flow of exhaust gas through the converter. The staggered arrangement of the indentations, shown in both FIGS. 1 and 2, assures that the exhaust gas flowing in the direction indicated by arrow 7 will not find a straight path through the converter, but will be forced to take a tortuous path. FIG. 2 is a top view of one layer or strip of the converter which further illustrates, by arrows 21, the tortuous path of the exhaust gas. The gas makes a right angle turn each time it impinges on one of the indentations. The particulates are thrown out of the gas and lodge in the cleft formed where an indentation presses against the adjacent strip.

The gas thus makes many right angle turns during its passage through the converter, and each turn removes a fraction of the particulates. In this way, the particulates are distributed throughout the entire converter so that the pressure drop does not build up rapidly. This is an essential feature of the invention, a feature that does not exist in the ceramic honeycomb particle trap. In the honeycomb trap, the particulates accumulate in a compact thin layer, and the gas must flow through this layer as the layer grows thicker and the pressure drop increases. In the converter of the present invention, the gas flows over, past, or around the particulates that have been trapped out. The pressure drop in the present invention does increase as particulates accumulate, but not as rapidly or as much as when the gas must flow through the accumulated particulates.

Each row of indentations diverts the gas through a right angle turn, which removes a fraction of the particulates. The fraction of the entering particles that finally passes through the converter can be made ever smaller by increasing the number of rows of indentations, as may be required for various applications. There is no such flexibility in the ceramic honeycomb trap, where a single ceramic wall does all of the trapping.

The indentations in FIG. 1 are cylindrical because they are generated by translating a straight line that remains parallel to its original position. As stated above, the indentations could also be generated by translating a curved line such that during the translation, every point on the curved line is at the same distance from its starting point. The indentations generated either way have several advantages. They resist crushing so that the strips can be packed together tightly to make a rigid structure. The rounded tops of the indentations form clefts against the adjacent strip, and the clefts are effective for retaining particulates. Finally, the indentations can be arranged into a compact pattern that gives many clefts per unit area of strip.

The indentations in adjacent layers are offset so that they do not coincide and nest together. In FIG. 2, the dotted rectangles 9 represent the indentations in the strip below the visible strip. The spacing between the indentations can be the same in all of the strips in the stack. It is only necessary that the indentations in adjacent layers be offset as shown in FIG. 2 so that the indentations in adjacent strips do not coincide and nest together.

Although the diesel converter has been described as comprising a stack of individual metal strips, the stack could also be constructed by folding a single strip of metal back and forth upon itself. The indentations in this case would be on opposite sides of the folded strip in alternate layers. This structure is disclosed in my U.S. Pat. No. 4,402,871, which is incorporated by reference herein. The present invention can be constructed either by stacking individual strips or by folding a single strip back and forth upon itself. As used herein, the term "stack of strips" is meant to include either means of construction.

When the converter is loaded with particulates that are to be burned off, a fuel is injected into the gas flowing through the converter. The fuel can be diesel fuel or any other fuel that can be vaporized. The fuel burns on the catalyzed surface and raises the temperature sufficiently to burn off the particulates. For complete burning of the particulates, this temperature must be as high as about 550° C. Such a temperature is seldom reached in the exhaust gas leaving a diesel engine. This is why the additional fuel must be injected.

There is insufficient contact between the trapped particulates and the catalyzed surface for the surface to catalyze the burning of the particulates. But there is excellent contact between the vaporized fuel and the catalyzed surface. Thus, the vaporized fuel burns readily and heats the converter, and the accumulated particles are in turn oxidized.

In the intervening periods between burn offs, the catalyzed surface serves to burn the hydrocarbons and the carbon monoxide in the exhaust, in the conventional way a converter is used in an emissions stream.

Figure 3:
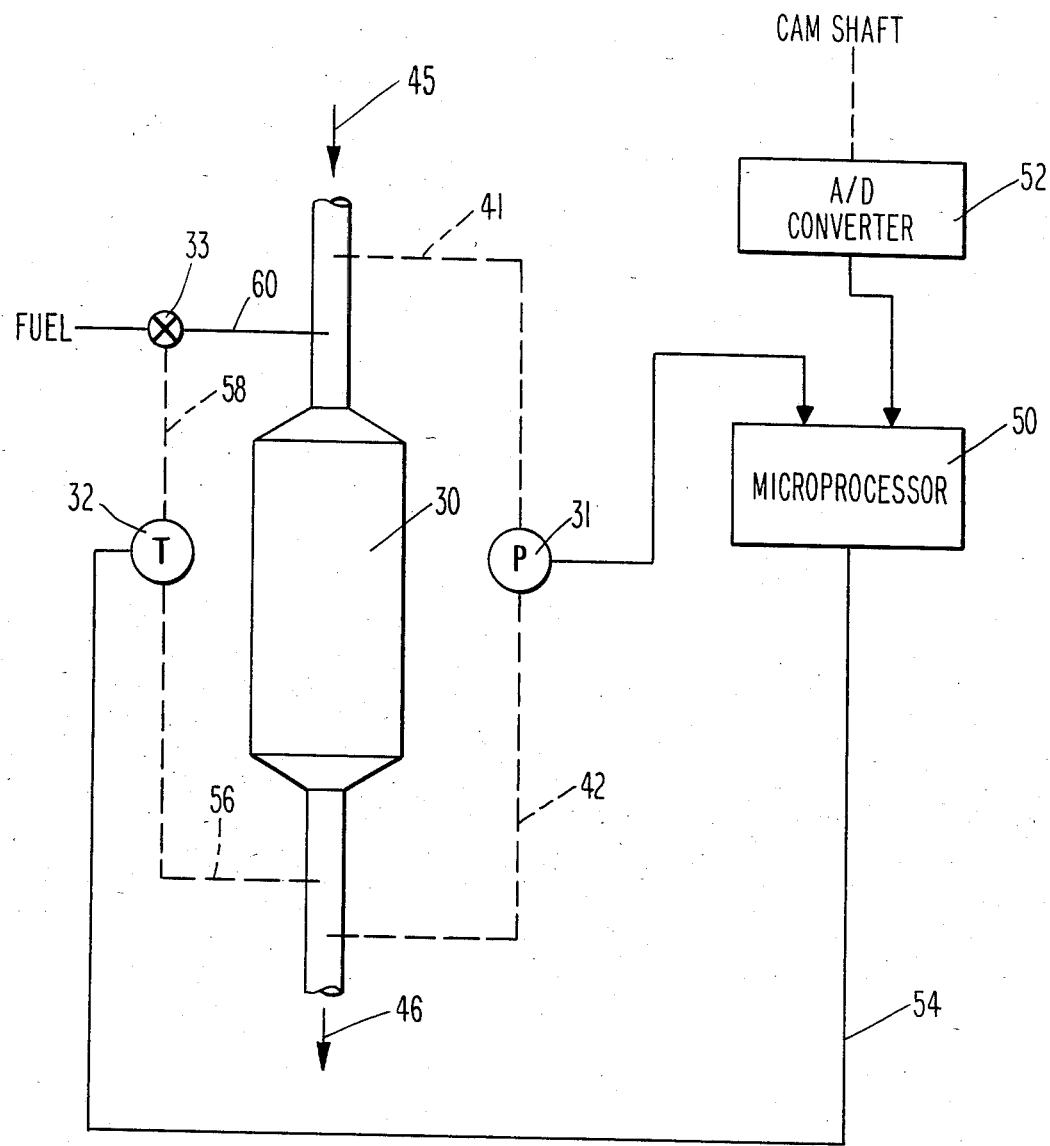
FIG. 3 is a schematic diagram illustrating an embodiment of the invention comprising automatic means for sensing a clogged condition of the catalytic converter, and for burning off the particulates therein.

FIG. 3 is a schematic diagram of an embodiment of the invention that automatically controls the state of the converter. The embodiment comprises a single catalytic converter 30 which is of the same construction as shown in FIGS. 1 and 2. That is, converter 30 comprises a stack of strips of the type shown in FIG. 1, having indentations which are offset from one layer to the next as shown in FIG. 2. Exhaust gas flows through the apparatus in the direction indicated by arrows 45 and 46.

The pressure drop across converter 30 is measured by pressure monitor 31. Pressure monitor 31 includes sensing means, indicated schematically by dotted lines 41 and 42, to measure the pressures at the input and output ends of converter 30. An excessively high difference in pressures, i.e. the pressure drop, indicates that the converter is clogged with particulates, and needs an injection of fuel to support their burn off.

The absolute value of the pressure measured at either the input or the output end of the catalytic converter depends on the velocity of flow of exhaust gas, which depends in turn on the speed of the engine. If the engine were operating at constant speed, the measurement of the difference between input and output pressures could be compared directly with a preset standard, and could be used to trigger the injection of fuel into the converter. But since the engine cannot be assumed to be running at constant speed, the direct readings from pressure monitor 31 are not meaningful.

The present invention therefrom includes a means for interpreting the meaning of the reading from pressure monitor 31. The means shown in FIG. 3 is microprocessor 50 which receives, as its inputs, the value of the pressure drop, from monitor 31, and the speed of the engine, which is supplied by an analog to digital converter 52 which is connected to the cam shaft of the engine. Stored in microprocessor 50 is a graph or table showing the maximum acceptable pressure drop for each engine speed.

When the pressure drop, as measured by pressure monitor 31, is found by microprocessor 50 to be greater than the maximum acceptable pressure drop for the current engine speed, microprocessor 50 emits a signal through its output line 54 to activate temperature controller 32. Temperature controller 32 is essentially a thermostat, and is connected, as represented symbolically by dotted line 56, to measure the temperature of the exhaust gas leaving catalytic converter 30. Controller 32 is also connected, as shown by dotted line 58, to valve 33. Valve 33 controls the flow of fuel, through fuel line 60, into catalytic converter 30.

After being enabled by a signal from microprocessor 50, temperature controller 32 maintains the temperature in the catalytic converter 30 at the desired level, about 600° C., by increasing or decreasing the flow of fuel.

Meanwhile, pressure monitor 31 continues to sense the pressure drop across converter 30. When the pressure drop falls below a level appropriate to the current engine speed, the microprocessor 50 emits a signal which turns off temperature controller 32, which causes the flow of fuel through line 60 to be shut off.

The process by which the catalytic converter is cleansed of its accumulated particulates by the burn off described above is known as regeneration. Regeneration will occur again when the pressure drop rises above an acceptable level (for a given engine speed). When the pressure drop falls below a predetermined level, for a given engine speed, regeneration is considered to be complete.

Figure 5:
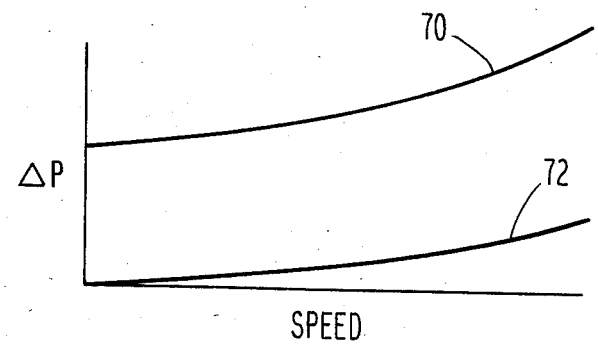
FIG. 5 is a diagram indicating the approximate relationship between engine speed and pressure drop through the converter.

FIG. 5 shows, in qualitative form, the information that is stored in microprocessor 50. The ordinate is the pressure drop, and the abscissa is the engine speed. Curve 70 represents the maximum acceptable pressure drop for each possible engine speed. When the pressure drop, at any engine speed, rises above this line, the catalytic converter needs regeneration. While the converter is being regenerated, microprocessor 50 continuously checks to see if the pressure drop has fallen below the value indicated by curve 72. When this condition occurs, the regeneration is complete, and the flow of fuel into the converter can be shut off.

It should be noted that the decisions to initiate and terminate regeneration of the catalytic converter, made by microprocessor 50, are made, in general, at different engine speeds. It is the stored information in the microprocessor, as represented by the graph in FIG. 5, that permits such decisions to be made, regardless of the engine speed at a particular moment. The graph of FIG. 5 may be represented in the microprocessor as a discrete table instead of a pair of continuous curves.

During the regeneration of a single converter, as shown in FIG. 3, all of the exhaust gas must be heated to about 600° C. Less fuel would be needed if only part of the exhaust gas had to be heated to the burn off temperature. This is accomplished by the embodiment shown in FIG. 4, wherein there are two catalytic converters.

Figure 4:
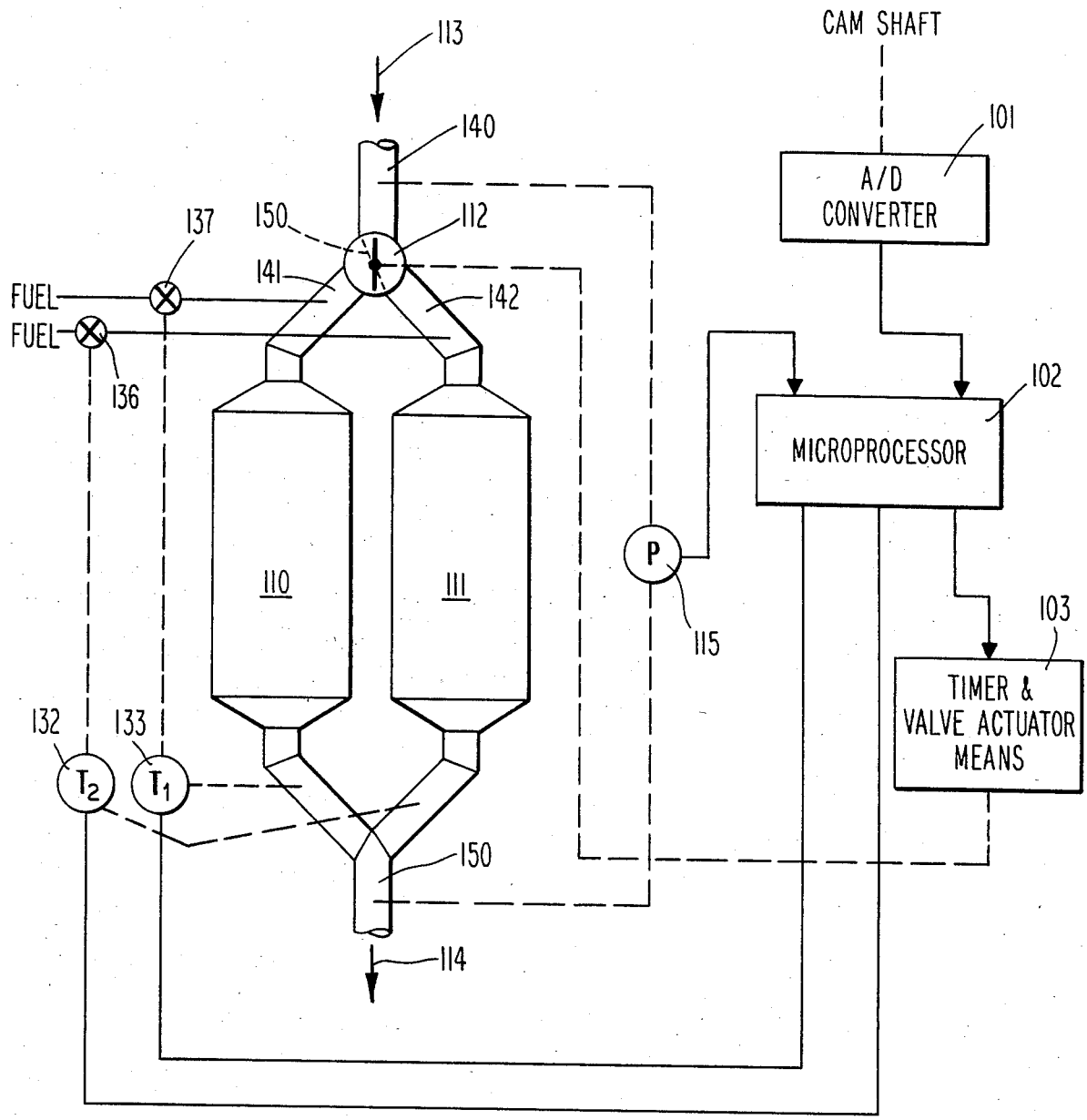
FIG. 4 is a schematic diagram illustrating another embodiment, wherein there are two converters, and wherein the particulates in only one converter are burned off at one time.

In the embodiment of FIG. 4, only one converter at a time is regenerated. Catalytic converters 110 and 111 are of substantially the same construction as that shown in FIG. 3, the direction of exhaust gas flow being indicated by arrows 113 and 114. Exhaust duct 140 is connected to butterfly valve 112, which is connected to conduits 141 and 142 which direct gas into catalytic converters 110 and 111, respectively. Butterfly valve 112 has three positions: a neutral position as shown, allowing gas to flow freely into both converters, and two positions which force most of the gas to flow to only one of the converters. Dotted line 150 represents one of the latter positions, which closes off most of the flow to converter 110. The remaining valve position, not shown, closes off most of the flow to converter 111. Butterfly valve 112 thus comprises a diverter means, which diverts the flow of gas to one or the other of the catalytic converters.

It is important that the flow of exhaust gas to either converter not be closed off entirely. Diesel engine exhaust contains relatively large amounts of oxygen, which is needed to support the combustion during the regeneration process.

As in the case of the single converter embodiment, a pressure monitor 115, is connected to the input and output ends of the apparatus. Note that the pressure drop must be measured at exhaust duct 140 and output duct 150. That is, the pressure drop is measured for the system as a whole.

As before, a microprocessor 102 receives inputs representing the pressure drop, as well as engine speed (from analog to digital converter 101). Microprocessor 102 stores a graph or table of the type suggested in FIG. 5.

Microprocessor 102 is connected to temperature controllers 132 and 133, which operate fuel valves 136 and 137, respectively, in a manner entirely similar to that described with respect to the single converter embodiment. However, microprocessor 102 is also connected to a timer and valve actuator means 103, which operates butterfly valve 112.

When the microprocessor 102 senses an unacceptably high pressure drop, it causes means 103 to turn butterfly valve 112 to one of its two non-neutral positions, and then to the other such position. For example, means 103 will first actuate valve 112 such that flow of gas through converter 110 is substantially cut off. Valve 112 is held in this position for a few seconds by means 103, while the microprocessor internally records and stores the observed pressure drop. This observed pressure drop gives an indication of the extent to which converter 111 is filled with particulates. Then, means 103 causes valve 112 to cut off most of the exhaust gas flow to converter 111, and to enable gas to flow through converter 110. The microprocessor then records and stores the pressure drop reading. The microprocessor 102 then selects the catalytic converter, either 110 or 111, that is in greater need of regeneration. Of course, at all times, microprocessor 102 automatically takes into consideration the engine speed at the time of measurement. For example, the microprocessor 102 would record, for both catalytic converters, the difference between the measured pressure drop and the curve 70 of FIG. 5. The converter whose reading is farther above curve 70 is the converter selected for regeneration.

When the microprocessor 102 selects a converter for regeneration, it emits an enabling signal to one of the temperature controllers 132 or 133 so as to cause fuel to be injected, in a controlled manner, into the converter selected for regeneration. This regeneration process is entirely similar to that discussed with reference to FIG. 3.

While one of the converters 110 or 111 is being regenerated, microprocessor 102 keeps a record of the elapsed time. After five minutes of regeneration, microprocessor momentarily disables the temperature controller, and, through means 103, turns butterfly valve 112 momentarily to the neutral position. The pressure drop across the entire apparatus is then measured. If the pressure drop is sufficiently low for the current engine speed, the regeneration is complete, and the system returns to its initial state, i.e. with butterfly valve 112 in the neutral position and both temperature controllers disabled. If the pressure drop is not low enough, microprocessor 102 re-activates the temperature controller that was previously operative, and regeneration continues. Thereafter, every minute, the microprocessor 102 interrupts the regeneration process to determine whether the regeneration may be terminated.

The test for completeness of the regeneration process requires only about one or two seconds. The entire regeneration process may take five to ten minutes, or more. It is expected that, for most of the period during which the engine is running, no regeneration is taking place, and valve 112 would therefore be in the neutral position most of the time.

It is clear that the objects of the invention are fulfilled by the above disclosure. It is understood that many modifications of the invention are possible. The embodiments of FIGS. 3 and 4 show a microprocessor to perform the controlling functions, but the same tasks could be accomplished by mechanical means. The particular control mechanisms for the pressure monitor and the temperature controllers could be varied, and different designs substituted. The number of strips in the converters, and the number of converters, could be varied. It is understood that these and other modifications are to be deemed within the spirit and scope of the following claims.

What is claimed is:

1. A catalytic converter for a diesel engine comprising at least two metal strips having a plurality of indentations, the indentations being of substantially equal height so that the spacing between the strips is equal to this height, the indentations in adjacent strips being offset so that the adjacent strips cannot coincide and nest together, the indentations being aligned transversely to the direction of flow of exhaust gas from the engine, the indentations being staggered, the indentations and the strips defining a tortuous flow path, between the strips, for exhaust gas from the engine, the tortuous flow path including at least one generally right-angle bend relative to the initial direction of flow of gas from the engine, and wherein the metal strips are coated with a combustion catalyst.

2. The catalytic converter of claim 1, wherein the indentations have a rounded top, the top forming a cleft against the adjacent strip, the cleft being effective for trapping particulates from the exhaust gas.

3. The catalytic converter of claim 2, wherein the indentations are of generally cylindrical shape.

4. A catalytic converter for a diesel engine comprising a plurality of layers of metal, each layer having indentations, the indentations being of substantially equal heights so that the spacing between layers is equal to this height, the indentations being aligned transversely to the flow axis of the diesel exhaust gas, the indentations being staggered, the indentations and the layers defining a tortuous flow path for exhaust gas from the engine, the tortuous flow path including at least one generally right-angle bend relative to the initial direction of flow of gas from the engine, wherein the indentations in adjacent layers are offset relative to each other so that adjacent layers cannot coincide and nest together, and wherein the layers are coated with a combustion catalyst.

5. The catalytic converter of claim 4, wherein said plurality of layers comprises a plurality of individual metal strips.

6. The catalytic converter of claim 4, wherein said plurality of layers comprises a single strip of metal folded back and forth upon itself.

7. The catalytic converter of claim 5, wherein the indentations have a generally cylindrical shape.

8. The catalytic converter of claim 6, wherein the indentations have a generally cylindrical shape.

9. An automatic, self-regenerating catalytic converter system for a diesel engine, comprising:
(a) a catalytic converter connected to receive exhaust gas from the diesel engine, the catalytic converter comprising a plurality of spaced-apart metal layers, the spacing between the layers being maintained by indentations in the layers, the indentations being aligned transversely to the direction of flow of exhaust gas from the engine, the indentations defining a tortous flow path for the exhaust gas, the flow path including at least one generally right-angle bend relative to the initial direction of flow of gas from the engine, the layers being coated with a combustion catalyst, (b) pressure monitoring means for continuously sensing the pressure drop between the input and output ends of the catalytic converter, (c) temperature regulating means for maintaining the temperature in the catalytic converter at a desired level, and (d) control means for actuating the temperature regulating means, the control means being connected to receive inputs from the pressure monitoring means and at least one moving part of the engine, the control means being adapted to actuate the temperature regulating means when the pressure drop, for a given engine speed, exceeds a predetermined level, and to deactivate the temperature regulating means when the pressure drop, for a given engine speed, falls below another predetermined level.

10. The catalytic converter system of claim 9, wherein the temperature regulating means comprises means for sensing the temperature of the exhaust gas leaving the catalytic converter, and valve means operatively connected to the sensing means, wherein the valve means controls the flow of fuel into the catalytic converter.

11. The catalytic converter system of claim 10, wherein the control means is operatively connected to the cam shaft of the engine, whereby the control means receives inputs from the pressure monitoring means and the engine cam shaft.

12. The catalytic converter system of claim 11, wherein the control means comprises a microprocessor, the microprocessor containing stored charts representing the maximum acceptable pressure drop for a given engine speed, and the pressure drop, for a given engine speed, below which the temperature regulating means should be deactivated.

13. The catalytic converter system of claim 12, wherein the cam shaft of the engine is connected to an analog-to-digital converter, and wherein the output of the analog-to-digital converter is connected to the input of the microprocessor.

14. An automatic, self-regulating catalytic converter system for a diesel engine comprising:
(a) a pair of catalytic converters, the catalytic converters being connected in parallel to receive exhaust gas from the diesel engine, the catalytic converters both comprising a plurality of spaced-apart metal layers, the spacing between the layers being maintained by indentations in the layers, the indentations being aligned transversely to the direction of flow of exhaust gas through the respective converter, the indentations defining a tortous flow path for the exhaust gas, the flow path including at least one generally right-angle bend relative to the initial direction of flow of gas from the engine, the layers being coated with a combustion catalyst, (b) pressure monitoring means for continuously sensing the pressure drop between the input and output ends of the parallel combination of the catalytic converters, (c) a pair of temperature regulating means for maintaining the temperature in the respective catalytic converters at a desired level, (d) diverter valve means for directing most of the exhaust gas from the engine into one or the other of the respective catalytic converters, and (e) control means for actuating either one of the temperature regulating means, the control means being connected to receive inputs from the pressure monitoring means and at least one moving part of the engine, the control means being adapted to actuate one of the temperature regulating means and the diverter valve means, when the pressure drop, for a given engine speed, across one of the catalytic converters, exceeds a predetermined level, and to deactivate that temperature regulating means when the pressure drop, for a given engine speed, across the parallel combination of the catalytic converters, falls below another predetermined level.

15. The catalytic converter system of claim 14, wherein both temperature regulating means comprise means for sensing the temperature of the exhaust gas leaving one of the catalytic converters, and valve means operatively connected to the sensing means, wherein the valve means controls the flow of fuel into that catalytic converter.

16. The catalytic converter system of claim 15, wherein the control means is operatively connected to the cam shaft of the engine, whereby the control means receives inputs from the pressure monitoring means and the engine cam shaft.

17. The catalytic converter system of claim 16, wherein the control means is connected to a timer and valve actuator means, the timer and valve actuator means being operatively connected to the diverter valve means, the timer and valve actuator means being capable of holding the diverter valve means in a selected position for a desired period of time.

18. The catalytic converter system of claim 17, wherein the control means comprises a microprocessor, the microprocessor containing stored charts representing the maximum acceptable pressure drop for a given engine speed, and the pressure drop, for a given engine speed, below which the currently activated temperature regulating means should be deactivated.

19. The catalytic converter system of claim 18, wherein the cam shaft of the engine is connected to an analog-to-digital converter, and wherein the output of the analog-to-digital converter is connected to the input of the microprocessor.

20. The catalytic converter system of claim 19, wherein the diverter valve means comprises a butterfly valve, the butterfly valve being having three positions, a neutral position allowing gas to flow freely into both catalytic converters, a second position forcing most of the gas to flow through only the first of the catalytic converters, and a third position forcing most of the gas to flow through only the second catalytic converter.

21. A method for removing the accumulated particulates from a catalytic converter for a diesel engine, comprising the steps of:
(a) measuring the pressure drop across the catalytic converter,
(b) monitoring the speed of the diesel engine,
(c) injecting a vaporizable fuel into the converter when the pressure drop, for the current engine speed, exceeds a predetermined level, (d) sensing the temperature at the output end of the catalytic converter, and varying the flow of fuel into the converter, in response to the sensed temperature, so as to maintain the temperature in the converter at a level suitable for burning off the particulates trapped therein, and (e) shutting off the flow of fuel into the converter when the pressure drop, for the current engine speed, falls below another predetermined level.

22. The method of claim 21, wherein the vaporizable fuel is the same fuel as that which is used to power the diesel engine.

23. A method for automatically regenerating a pair of catalytic converters for a diesel engine, the catalytic converters being connected in parallel, comprising the steps of:

(a) measuring the pressure drop across the parallel combination of the catalytic converters, (b) monitoring the speed of the diesel engine, (c) selecting one or the other of the catalytic converters to be regenerated when the pressure drop, for the current engine speed, for the parallel combination of catalytic converters, exceeds a predetermined level, the selecting step being performed by choosing the converter having the greater pressure drop, for a given engine speed, to be regenerated, (d) injecting a vaporizable fuel into the converter selected for regeneration, (e) sensing the temperature at the output end of the catalytic converter being regenerated, and varying the flow of fuel into that converter, in response to the sensed temperature, so as to maintain the temperature in that converter at a level suitable for burning off the particulates trapped therein, the combustion being supported by the exhaust gas from the engine, (f) periodically measuring the pressure drop across the parallel combination of catalytic converters, and (g) shutting off the flow of fuel into the converter being regenerated when the pressure drop, for the current engine speed, for the parallel combination of catalytic converters, falls below another predetermined level.

24. The method of claim 23, wherein the selecting step comprises the steps of:

(a) closing off most of the flow of exhaust gas to one of the catalytic converters, (b) measuring the pressure drop across the parallel combination of catalytic converters, (c) closing off most of the flow of exhaust gas to the other of the catalytic converters, (d) measuring the pressure drop across the parallel combination of catalytic converters, and (e) selecting the catalytic converter to be regenerated which has the higher pressure drop, for the current engine speed.

25. The method of claim 23, wherein the vaporizable fuel is the same fuel as that which is used to power the diesel engine.

26. An automatic, self-regenerating catalytic converter system for a diesel engine, comprising:

(a) a catalytic converter connected to receive exhaust gas from the diesel engine, the catalytic converter comprising a plurality of spaced-apart metal layers, the spacing between the layers being maintained by indentations in the layers, the indentations being aligned transversely to the direction of flow of exhaust gas from the engine, the layers being coated with a combustion catalyst, (b) pressure monitoring means for continuously sensing the pressure drop between the input and output ends of the catalytic converter.

(c) means for injecting a vaporizable fuel into the converter, (d) control means for actuating the injecting means, the control means being connected to receive inputs from the pressure monitoring means and at least one moving part of the engine, the control means being adapted to actuate the injecting means when the pressure drop, for a given engine speed, exceeds a predetermined level, and to deactivate the injecting means when the pressure drop, for a given engine speed, falls below another predetermined level.

27. The system of claim 26, further comprising means for sensing the temperature at the outlet end of the converter, and means for varying the flow of fuel into the converter, in response to the sensed temperature, whereby the temperature in the converter can be maintained at a desired temperature.

28. An automatic, self-regenerating catalytic converter system for a diesel engine comprising:

(a) a pair of catalytic converters, the catalytic converters being connected in parallel to receive exhaust gas from the diesel engine, the catalytic converters both comprising a plurality of spaced-apart metal layers, the spacing between the layers being maintained by indentations in the layers, the indentations being aligned transversely to the direction of flow of exhaust gas through the respective converter, the layers being coated with a combustion catalyst, (b) pressure monitoring means for continuously sensing the pressure drop between the input and output ends of the parallel combination of the catalytic converters, (c) diverter valve means for directing most of the exhaust gas from the engine into one or the other of the respective catalytic converters, and (d) control means for injecting a vaporizable fuel into one or the other of the converters, the control means being connected to receive inputs from the pressure monitoring means and at least one moving part of the engine, the control means being adapted to actuate the diverter valve means and to inject fuel into one of the converters, when the pressure drop, for a given engine speed, across that converter, exceeds a predetermined level, and to shut off the flow of fuel to that converter when the pressure drop, for a given engine speed, across the parallel combination of the catalytic converters, falls below another predetermined level.

29. An automatic, self-regenerating catalytic converter system for a diesel engine, comprising:

(a) a catalytic converter connected to receive exhaust gas from the diesel engine, the catalytic converter comprising a plurality of spaced-apart metal layers, the spacing between the layers being maintained by indentations in the layers, the indentations being aligned transversely to the direction of flow of exhaust gas from the engine, the indentations defining a tortuous path for the exhaust gas, the flow path including at least one generally right-angle bend relative to the initial direction of flow of gas from the engine, the layers being coated with a combustion catalyst, (b) pressure monitoring means for continuously sensing the pressure drop between the input and output ends of the catalytic converter, (c) means for injecting a vaporizable fuel into the converter, (d) control means for actuating the injecting means, the control means being connected to receive inputs from the pressure monitoring means and at least one moving part of the engine, the control means being adapted to actuate the injecting means when the pressure drop, for a given engine speed, exceeds a predetermined level, and to deactivate the injecting means when the pressure drop, for a given engine speed, falls below another predetermined level.

30. An automatic, self-regenerating catalytic converter system for a diesel engine comprising:

(a) a pair of catalytic converters, the catalytic converters being connected in parallel to receive exhaust gas from the diesel engine, the catalytic converters both comprising a plurality of spaced-apart metal layers, the spacing between the layers being maintained by indentations in the layers, the indentations being aligned transversely to the direction of flow of exhaust gas through the respective converter, the indentations defining a tortuous flow path for the exhaust gas, the flow path including at least one generally right-angle bend relative to the initial direction of flow of gas from the engine, the layers being coated with a combustion catalyst, (b) pressure monitoring means for continuously sensing the pressure drop between the input and output ends of the parallel combination of the catalytic converters, (c) diverter valve means for directing most of the exhaust gas from the engine into one or the other of the respective catalytic converters, and (d) control means for injecting a vaporizable fuel into one or the other of the converters, the control means being connected to receive inputs from the pressure monitoring means and at least one moving part of the engine, the control means being adapted to actuate the diverter valve means and to inject fuel into one of the converters, when the pressure drop, for a given engine speed, across that converter, exceeds a predetermined level, and to shut off the flow of fuel to that converter when the pressure drop, for a given engine speed, across the parallel combination of the catalytic converters, falls below another predetermined level.

* * * * *